United States Patent [19]

Nakamura et al.

[11] Patent Number: 4,521,777
[45] Date of Patent: Jun. 4, 1985

[54] APPARATUS FOR VISUALLY INDICATING THE CURRENT LOCATION OF AN AUTOMOTIVE VEHICLE

[75] Inventors: Yukinobu Nakamura; Katsutoshi Tagami; Tsuneo Takahashi, all of Saitama, Japan

[73] Assignee: Honda Giken Kogyo Kabushiki Kaisha, Tokyo, Japan

[21] Appl. No.: 408,274

[22] Filed: Aug. 16, 1982

[30] Foreign Application Priority Data

Aug. 21, 1981 [JP] Japan ................................ 56-130942

[51] Int. Cl.³ .............................................. G08G 1/12
[52] U.S. Cl. ..................................... 340/995; 33/356; 340/988; 364/449; 364/460
[58] Field of Search .................... 340/23, 24, 988, 995; 364/457, 460, 449, 450, 571; 73/504, 505, 516 LM, 1 E, 178 R; 33/356; 343/451, 452

[56] References Cited

U.S. PATENT DOCUMENTS

| | | | |
|---|---|---|---|
| 4,032,758 | 6/1977 | Lewis | 364/457 |
| 4,327,498 | 5/1982 | Setter | 33/356 |
| 4,347,730 | 9/1982 | Fisher | 73/178 R |
| 4,402,050 | 8/1983 | Tagami | 364/460 |

Primary Examiner—James J. Groody
Attorney, Agent, or Firm—Irving M. Weiner; Pamela S. Burt

[57] ABSTRACT

A current location indicating apparatus for use in an automotive vehicle wherein a current location of the automotive vehicle is arithmetically obtained in terms of two-dimensional coordinates by a signal processing unit on the basis of the outputs from a travel distance detecting unit and a bearing detecting unit, and the current location of the vehicle is visually indicated on the screen of a display from the thus-obtained data in connection with the current location thereof. The apparatus comprises, in operative combination, a first bearing detecting unit employing an earth magnetism sensor as a primary component, a second auxiliary detecting unit employing a rate type gyroscope or the like, and a signal processing unit adapted to monitor the output from the first bearing detecting unit in comparison with the operating state of the second auxiliary bearing detecting unit to determine whether or not the earth magnetism sensor of the first bearing detecting unit is under the influence of any external disturbances for a short period so that the output of the first bearing detecting means can be corrected accordingly.

1 Claim, 7 Drawing Figures

APPARATUS FOR VISUALLY INDICATING THE CURRENT LOCATION OF AN AUTOMOTIVE VEHICLE

BACKGROUND OF THE INVENTION

1. Field of the Invention

The present invention relates generally to a device for visually indicating a current location of a vehicle. More particularly, the invention relates to an improved apparatus for determining and visually indicating a current location of an automotive vehicle to the driver thereof, wherein a stable and quick-start locating operation is attained from the combination of an earth magnetism sensor and a rate type gyroscope by the selection of one of the two which suits the particular situation at hand.

2. Description of Relevant Art

A known apparatus has been developed for the determination and visual indication of a current location of an automotive vehicle to the driver thereof which comprises a travel distance counter section adapted to determine the current mileage or travel distance of an automotive vehicle in terms of, for example, its travel speed, and a bearing detector section adapted to detect the current orientation and extent of azimuthal deviation of the vehicle in accordance with its travel direction per a given distance from its starting point. The current location of the vehicle along its travel route is obtained arithmetically from the thus-obtained detection data, the result of which calculation is visually indicated on a display for the driver of the vehicle by way of spot information varying from time to time upon a suitable road map shown in the display indicating the travel route along which the vehicle is currently travelling.

In the aforesaid known apparatus for visually indicating a current location of an automotive vehicle, an earth magnetism sensor is employed as a bearing detection means, which is designed to sense the earth magnetism so that it may detect a current relative relationship such as, for example, a current angular relationship between the orientation of a current horizontal component of the earth magnetism and a current travel direction of the vehicle.

In such a bearing detecting apparatus which employs an earth magnetism sensor, because such apparatus can consistently present the absolute orientation of the vehicle with respect to a current location thereof, unlike one which employs a rate type gyroscope in which it is very possible that errors will be accumulated in the bearing detection as developed from possible drifts of the gyroscope during vehicle operation to such an extent that information obtained from the thus-accumulated errors present an erroneous locating indication of the vehicle on the display screen, it is possible for the bearing detecting apparatus of the earth magnetism sensor type to provide relatively stable operation on the average for a long distance. In contrast, however, from a short-term standpoint, the earth magnetism sensor type bearing detecting apparatus is inconveniently substantially susceptible to disturbances from external structures such as a railroad crossing or an iron bridge which the vehicle may pass by, or when a large-sized truck travels near to the vehicle, so that the display presents undesired incorrect information on a current location to the driver of the vehicle which deviates from a predetermined course of travel due to the thus-far accumulated errors in the location detecting.

When the vehicle provided with the aforesaid type bearing detecting apparatus is subject to the foregoing conditions, it is very difficult or even impossible for the driver thereof to determine whether the displayed information on the screen is incorrect or if the vehicle is actually travelling in a different or incorrect way, thus resulting in substantial ambiguity.

The present invention effectively overcomes the foregoing inconveniences and difficulties experienced with the conventional location detecting apparatus for use in an automotive vehicle.

SUMMARY OF THE INVENTION

It is a primary object of the present invention to provide an improved location detecting apparatus for use in an automotive vehicle which provides both a quick-start initial operation and stable continuous operation in location detection functioning with a substantial insensitivity to any disturbances from the environment in the proximity of the vehicle.

It is another object of the present invention to provide an improved location detecting apparatus for an automotive vehicle which incorporates an earth magnetisem sensor as a primary component, together with another auxiliary detecting means such as a rate type gyroscope or the like, the former serving a quick-start function in the location detecting operation of an automotive vehicle immediately upon power-up without the necessity of waiting during a rising time period until the system reaches stability in performance, and the latter presenting a substantial insensitivity to disturbances from the environment surrounding the vehicle. It is thus possible to readily correct the output from the earth magnetism sensor when it encounters any disturbances through compensation with the output from the auxiliary detecting means.

The present invention provides an improved location detecting apparatus for use in an automotive vehicle wherein a current location of the automotive vehicle is arithmetically obtained in terms of two-dimensional coordinates by a signal processing unit on the basis of the outputs from a travel distance detecting unit and a bearing detecting unit, and the current location of the vehicle is visually indicated on the screen of a display from the thus-obtained data in connection with the current location thereof. The apparatus comprises, in operative combination, a first bearing detecting unit employing an earth magnetism sensor as a primary component, a second auxiliary detecting unit employing a rate type gyroscope or the like, and a signal processing unit adapted to monitor the output from the first bearing detecting unit in comparison with the operating state of the second auxiliary bearing detecting unit to determine whether or not the earth magnetism sensor of the first bearing detecting unit is under the influence of any external disturbances for a short period so that the output of the first bearing detecting means can be corrected accordingly.

The above and further objects, details and advantages of the present invention will become apparent from the following detailed description, when read in conjunction with the accompanying drawings.

DETAILED DESCRIPTION OF PREFERRED EMBODIMENTS

Figure 1:
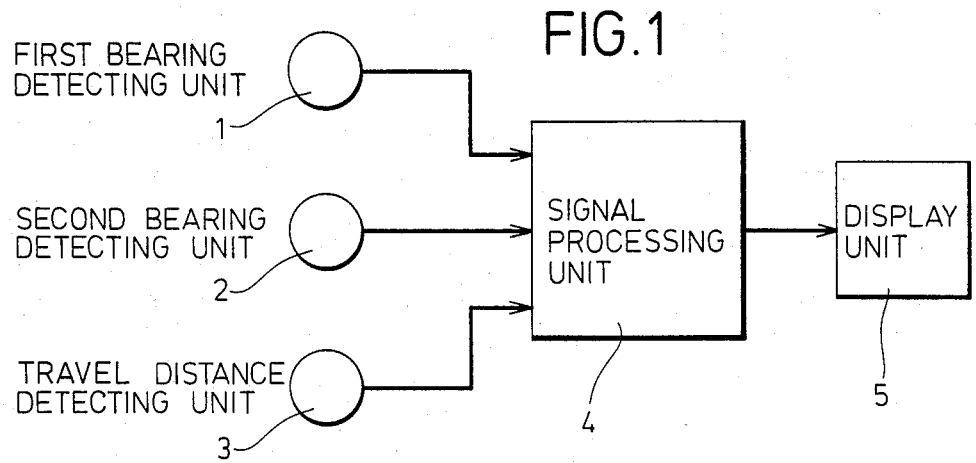
FIG. 1 is a schematic block diagram showing the basic construction of a current location detecting apparatus according to a preferred embodiment of the present invention.

With reference to FIG. 1, there is schematically shown the typical and basic construction of an improved current location detecting apparatus for use in an automotive vehicle according to a preferred embodiment of the present invention. The apparatus includes a first bearing detecting unit 1 which comprises an earth magnetism sensor adapted to generate electric signals indicating the absolute bearing data in accordance with the current travel direction of the vehicle; a second bearing detecting unit 2 comprising another type of auxiliary bearing detector such as, for example, a rate type gyroscope adapted to generate electric signals in proportion to the current quantity of azimuthal deviation from the current bearing of the automotive vehicle in accordance with a current travel direction of the vehicle; a steering motion sensor; and a device for detecting a current differential revolution number generated in the left and right wheels of the vehicle. A travel distance detecting unit 3 comprises, for example, a sensor or pulse generator of a photoelectric, electromagnetic or mechanical contact type which is adapted to produce signals corresponding to a current travel distance or number of revolutions of the vehicle's wheels. A signal processing unit 4 comprises a CRT display, a liquid crystal display or the like, and is adapted to visually indicate information on a current location of the vehicle as being updated from time to time on the basis of the thus-obtained location data of the vehicle as indicated varying from time to time on two-dimensional coordinates from the signal processing unit 4.

In this particular construction of the current location detecting apparatus according to the present invention, it is to be noted that the signal processing unit 4 is adapted to monitor the output from the first bearing detecting apparatus in comparison with the operating state of the second bearing detecting apparatus 2 to determine whether or not the earth magnetism sensor of the first bearing detecting unit 1 is under the influence of external disturbances at any moment or in a relatively short term of operation, so that the output of the first bearing detecting unit 1 can immediately be corrected in accordance with the output from the second bearing detecting unit 2 upon the detection of any such disturbance.

Figure 2:
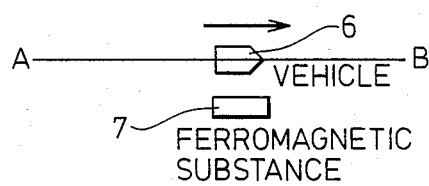
FIG. 2 is a graphic representation showing a typical example of a state observed during travel of an automotive vehicle.
Figure 3A:
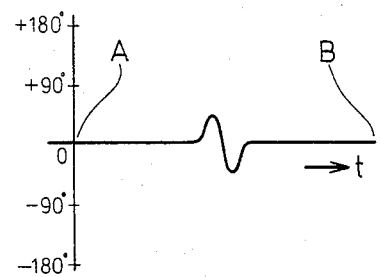
FIGS. 3(a) and 3(b) are graphic representations showing the characteristics of the outputs from first and second bearing detecting apparatus in terms of the orientation thereof during the travel state of the vehicle corresponding to the condition shown in FIG. 2.
Figure 3B:
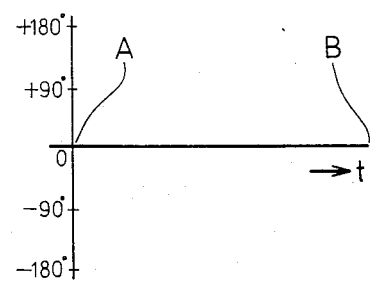

More specifically, as typically shown in FIG. 2, if there exists a relatively large-sized ferromagnetic object 7 alongside a straight line A-B along which the vehicle 6 is travelling and if the vehicle passes near the object 7, the first bearing detecting unit 1 which comprises an earth magnetism sensor might possibly be influenced under the effect of the magnetism with its output being affected substantially as shown schematically in FIG. 3(a), while the output from the second bearing detecting unit 2 remains entirely unaffected because it is insensitive to the magnetism from the objects 7, as typically shown in FIG. 3(b).

Figure 4A:
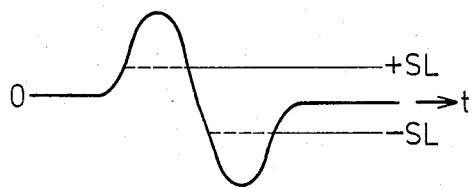
FIGS. 4(a) and 4(b) are graphic representations respectively showing the output characteristics of the first and second bearing detecting apparatus when the output from the first apparatus is corrected.
Figure 4B:

In this respect, conditional upon the output from the first bearing detecting unit 1 varying beyond threshold values +SL and −SL as predetermined upper and lower limits above or below a zero level, while the output of the second bearing detecting unit 2 remains unchanged, as generally shown in FIGS. 4(a) and 4(b), it is then determined that the output from the first bearing detecting unit 1 is under the influence of the disturbance at this moment, and consequently, it is arranged, for example, that the output from the first bearing detecting unit 1 is then forced to be equal with such threshold level values as schematically shown ov the broken lines in FIG. 4(a). In this connection, it will be understood that this particular output from the first bearing detecting unit 1 is duly controlled to be a certain constant value somewhere in the range of threshold values between +SL and −SL.

With such construction of the current location detecting apparatus according to the present invention, the signal processing unit 4 functions essentially to consistently arithmetically calculate a current location of the vehicle on the basis of a current bearing detecting signal from the first bearing detecting unit 1 during the normal operation of the vehicle without any substantial effect of external disturbances, and in accordance with the corrected bearing detecting signals therefrom upon the process of compensation in terms of the output from the second bearing detecting unit 2 when the earth magnetism sensor is under the influence of disturbances, accordingly.

Figure 5:
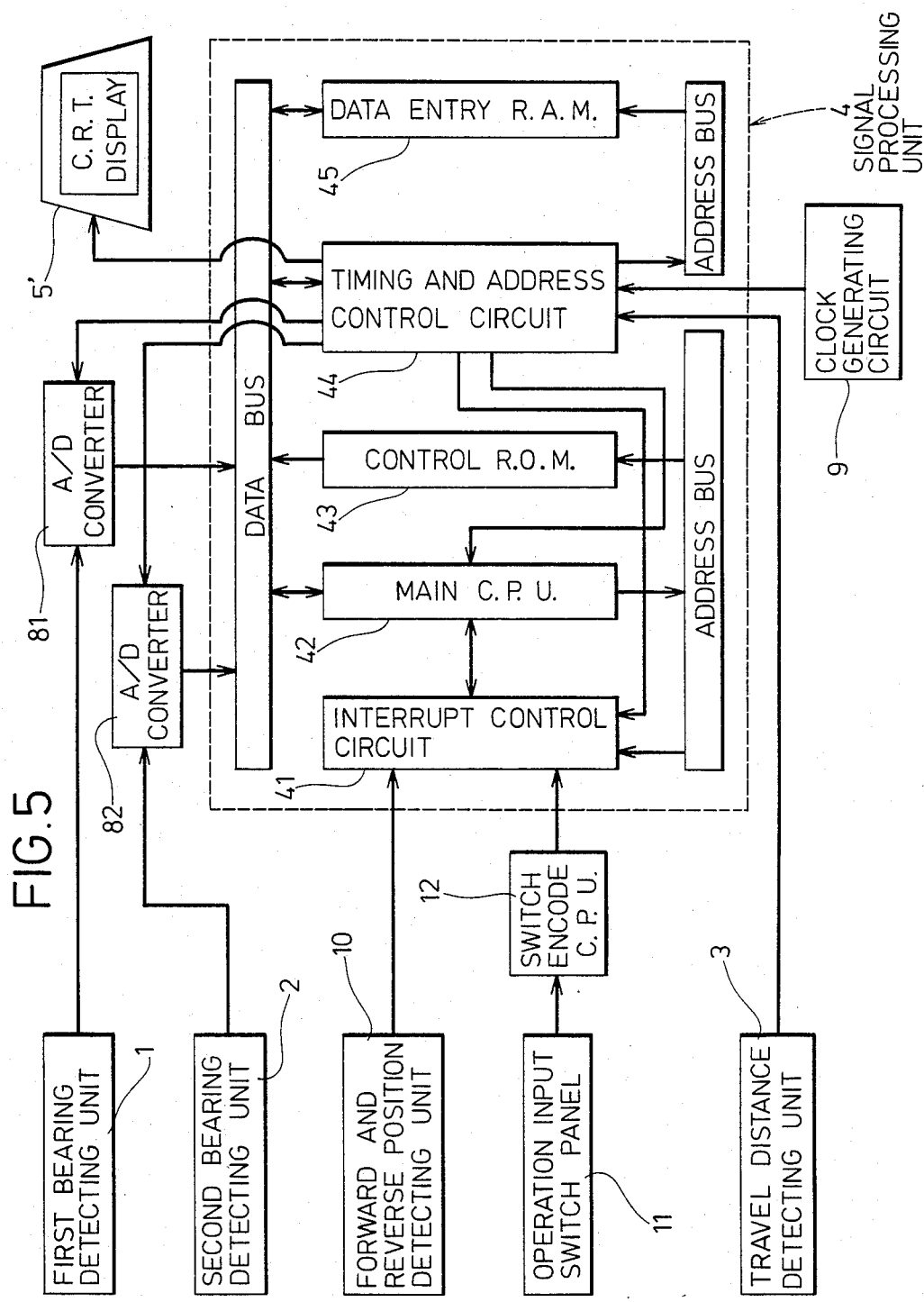
FIG. 5 is a block diagram showing a typical example of the circuit construction of the bearing detecting apparatus according to the invention.

FIG. 5 is a block diagram which shows, by way of a typical example, the general construction of the current location detecting apparatus of an automotive vehicle according to the present invention.

According to the particular construction shown in FIG. 5, there is provided the processing unit 4 which comprises a parallel signal input/output and interrupt control circuit 41, a main CPU 42, a control ROM 43, a timing and address control circuit 44, and a data entry RAM 45, wherein the output signals from the first and second bearing detecting units 1 and 2 are transmitted through the analog-digital (A/D) converters 81, 82 to the data bus of the signal processing unit 4, respectively.

Concurrently, the timing and address control circuit 44 is directly fed with the output from the travel distance detecting unit 3 and also with the timing clock from the clock generating circuit 9, the timing and address control circuit 44 transmitting the horizontal and vertical synchronizing signals and the video signals to the CRT display 5', and the control signals to the A/D converters 81, 82, respectively. On the other hand, the output signals from the forward and reverse position detecting unit 10, which is adapted to detect the forward and reverse driving states of the vehicle, are transmitted to the parallel input/output and interrupt control circuit 41 in such a manner as to correct a current bearing detection signal as fed by the A/D converters 81, 82 and the pulse signals as fed by the travel distance detecting unit 3, accordingly, at the moment that a reverse driving position is detected.

In addition, there is provided an operation input switch panel 11 which enables the scale of indication on the screen of the CRT display 5' to be changed as desired and the retrieving mark to be indicated on the screen of the CRT display 5' wherever necessary, so that a current location of the vehicle can be checked visually and immediately on the indication on the screen, and a switch encode CPU 12 which is adapted to transfer varied operating command signals to the parallel input/output and interrupt control circuit 41 in accordance with the due combination of the contacts of the switch panel 11.

As described in detail hereinabove, according to the present invention there is provided an improved current location indicating apparatus for use in an automotive vehicle wherein a current location of the automotive vehicle in terms of two-dimensional coordinates is arithmetically obtained by the signal processing unit on the basis of the outputs from the travel distance detector and the bearing detector, and the current location of the vehicle is visually indicated on the screen of the display from the thus-obtained data in connection with the current location. The apparatus comprises, in operative combination, the earth magnetism sensor as a primary component, together with the different auxiliary detecting means such as a rate type gyroscope or the like, the signal processing unit adapted to monitor the output from the first bearing detecting apparatus in comparison with the operating state of the second bearing detecting apparatus 2 to determine whether or not the earth magnetism sensor of the first bearing detecting unit 1 is under the influence of external disturbances at any moment or in a relatively short term of operation, so that the output of the first bearing detecting unit 1 can immediately be corrected in accordance with the output from the second bearing detecting unit 2 upon the detection of any such disturbance. Thus, any substantial disturbances temporarily affecting the apparatus of the vehicle, such as when passing by or near a railroad crossing, an iron bridge, or similar structure, are advantageously prevented, and the constantly-accurate visual indication of a current location of the vehicle is assured.

It will now be understood that the objects as set forth hereinabove among those made apparent from the preceding description are efficiently attained, and because certain changes and modifications may be made in the foregoing without departing from the spirit and scope of the invention, it is intended that all matter contained in the foregoing description or shown in the accompanying drawings shall be interpreted as illustrative and not limiting.

It is also to be understood that the appended claims are intended to cover all of such generic and specific features particular to the invention as disclosed herein and all statements relating to the scope of the invention which might be said to fall thereunder.

We claim:

1. A current location indicating apparatus for use in an automotive vehicle wherein a current location of said automotive vehicle is arithmetically obtained in terms of two-dimensional coordinates by a signal processing unit on the basis of the outputs from a travel distance detecting unit and a bearing detecting unit, and the current location of said vehicle is visually indicated on the screen of a display from the thus-obtained data in connection with the current location thereof, which comprises, in operative combination:

first bearing detecting means including an earth magnetism sensor as a primary component thereof;

second auxiliary detecting means including a rate type gyroscope or the like; and signal processing means for continuously monitoring the output from said first bearing detecting means in comparison with the operating state of said second auxiliary bearing detecting means to determine whether or not said earth magnetism sensor of said first bearing detecting means is under the influence of external disturbances for a short period so that the output of said first bearing detecting means can be immediately corrected accordingly, while said vehicle is in motion.

* * * * *